W. L. GEBBY.
Cotton-Planter.
No. 60,170.  Patented Dec. 4, 1866.
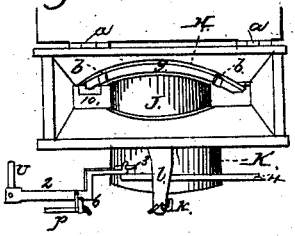
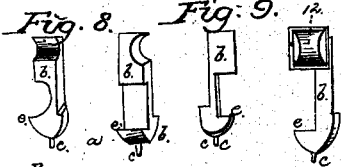
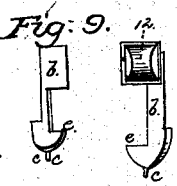
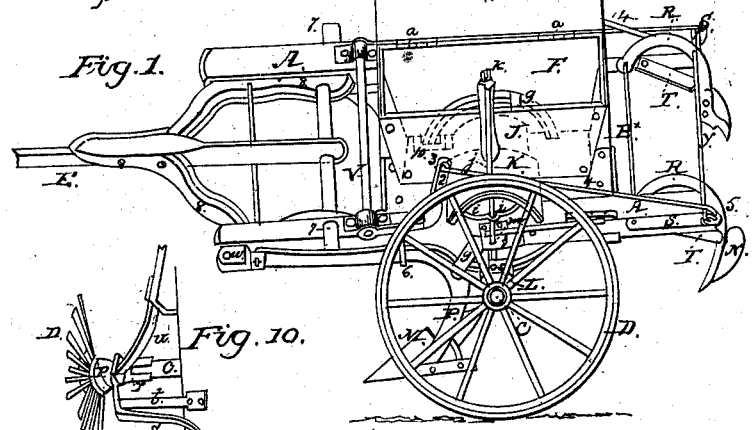
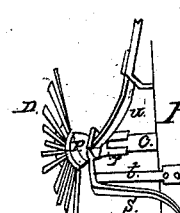
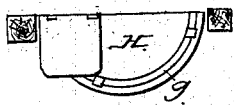
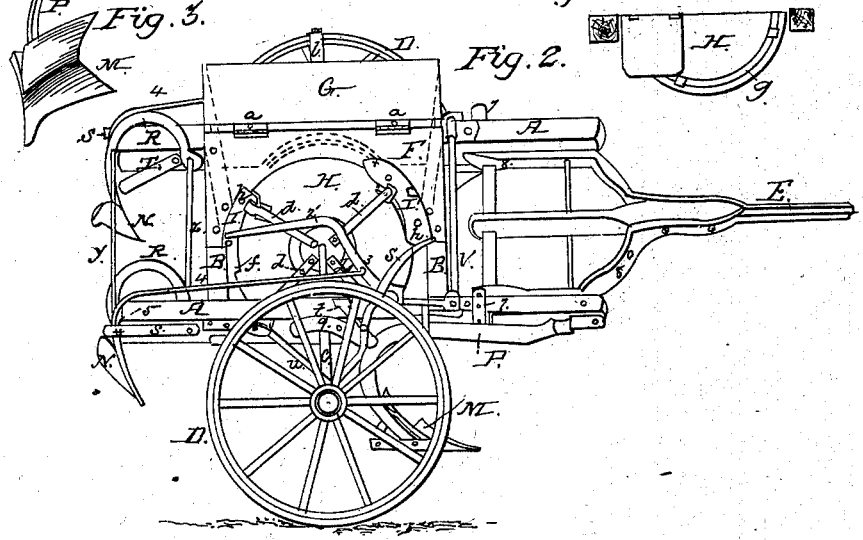
WITNESSES:
INVENTOR:
Wm L. Gebby
per D. E. Somes & Co.
Attorneys

United States Patent Office.

IMPROVEMENT IN COTTON PLANTER.

WILLIAM L. GEBBY, OF NEW RICHLAND, OHIO.

*Letters Patent No. 60,170, dated December 4, 1866.*

SPECIFICATION.

TO ALL WHOM IT MAY CONCERN:

Be it known that I, WILLIAM L. GEBBY, of New Richland, in the county of Logan, and State of Ohio, have invented a new and useful Machine for Planting Cotton and other Seeds; and I do hereby declare that the following is a full, clear, and exact description thereof, reference being had to the accompanying drawings, and to the letters of reference marked thereon, in which—

Figure 1 represents a view in perspective of my machine; looking at it from the left-hand side; and Figure 2 a similar view, but looking at it from the right-hand side.

Figure 3 represents one of the front or ridging ploughs detached; and

Figure 4 one of the rear or covering ploughs detached.

Figure 5 represents a portion of a plunger which forces the seed into the droppers, showing the mechanism by which it is operated.

Figure 6 represents a portion of the dropper-wheel.

Figure 7 is a plan of the seed box.

$a\ b\ c$, Figure 8, are different views of the droppers which are used for planting cotton.

Figure 9 is a view of the dropper used for planting corn, broom corn seed, sorghum seed, &c..

Figure 10 represents one end of the axle on which is an adjustable clutch.

Similar letters indicate corresponding parts in each figure.

The object of my invention is to construct a combined machine that will plant cotton seed correctly and in any quantity desired, without divesting it of the cotton that adheres to it on coming from the gin, and and without subjecting it to a rolling process, either of which interferes very materially with its germination, and one that is equally applicable for planting corn, broom corn, sorghum seed, &c., by merely changing the droppers. In making my machine I construct a frame consisting of the side-rails A A, connected by the cross-bars B B. The said frame is set on an iron axle C, and secured to it by boxing the axle, being supported on the wheels D D. To the front end of the frame is attached the tongue E, which is constructed with hounds similar to an ordinary wagon tongue. On the cross-bars B B is secured a box, F, for containing the seed to be planted, the said box being provided with a lid, G, secured to the box by the hinges $a\ a$. Near the centre of the axle is rigidly secured a dropper-wheel H, the axle passing through the centre of the wheel. The dropper-wheel extends up and forms a part of one side of the seed box, the side of the box being cut away so as to fit the wheel. Near the periphery of the dropper-wheel, and transversely through it, are formed holes, through which pass the peculiarly constructed $b\ b$; the outer ends $c\ c$ of the droppers are attached to the ends of the springs $d\ d$, the opposite ends of the said springs being firmly secured to the dropper-wheel near its centre. On the outside of the seed box are secured the inclined planes I and I', which are curved to correspond to the periphery of the dropper-wheel, one being at the front and the other at the rear of said wheel. During the revolution of the dropper-wheel the shoulders $e\ e$ of the droppers $b\ b$ pass on the inclined plane at the point $f\ f$, and as the wheel revolves the droppers are gradually drawn out, so that the inner ends thereof will be on a line with the bead $g$ on the inside of the wheel, and thus they will pass through the bottom of the box, without requiring a larger aperture than is necessary for the passage of the bead. When the shoulders $e\ e$ pass off the top $h\ h$ of the inclined planes the springs $d\ d$ suddenly throw the droppers in, so that their inner ends project beyond the bead $g$ into the box F. The central part J of the bottom of the seed box is convex lengthwise of the box, and extends almost to the bead $g$ on the dropper-wheel, and thus keeps the seed uniformly up to near the bead and droppers. Immediately over the convex bottom of the seed box is placed a plunger or false bottom, K, which extends through the side of the feed box opposite the dropper-wheel, the side of the box being cut away to correspond with the form of the plunger. The arms $i\ i$ connect the outer end of the said plunger to the upright lever $j$, which has its fulcrum at $k$ on the end of the arm $l$, which is secured to the side of the seed box. The said lever extends down through a slot in the plate $m$ to the axle C. The lever $j$ is operated by the spiral flange or cam L, which is firmly secured to the axle C. As the axle revolves, the said flange gradually forces the plunger K into the seed box until the top of the flange $n$ passes the lever $j$, when the lever and plunger are suddenly drawn out by the spring $o$, and thus the plunger is alternately forced in and drawn out on each revolution of the axle. The plunger by its peculiar reciprocating motion forces the seed up so that it will be grasped by the droppers, and also prevents the seed from packing in the box. On the axle near the right-hand wheel is placed a cylindrical clutch, $p$, fig. 10, which gears with angular teeth formed on the inner end of the nave of the right-hand wheel. The slot $q$ will allow a sufficient motion of the clutch lengthwise of the axle to throw it out of gear, and the pin $r$ forces the clutch to revolve with the axle. The said clutch may be thrown out of gear by means of the crooked lever $s$, which has its fulcrum on the end of the arm $t$, which is secured to, and projects horizontally from, the side-rail A. The lower end of the lever $s$ is forked, and is set astride of the clutch $p$, a groove being formed around the cylinder of the clutch for that purpose, and thus the lever does not interfere with the revolving of the clutch. On releasing the lever the clutch is thrown in gear by the spring $u$. On my machine I use four ploughs, the front ones, M M, being the ordinary right and left-hand ploughs, and are arranged so as to throw the earth inward and form a ridge with a furrow on top of it, in which the seed is dropped; and the rear ploughs N N are so formed and arranged that they will close the furrow and cover the seed. The ends of the beams P, to which the front ploughs are secured, are jointed to the side-rails at $v$ by means of bolts, and may be adjusted higher or lower by means of the holes $w\ w$. The rear ploughs N N are secured to the lower ends of the curved bars R R, placed on the inner side of the side-rails, to which they are hinged by means of the rod $x$, which passes across the frame and through the side-rails. The said bars are connected by another rod $y$, which extends across the rear end of the frame and through the ends of the arms S S, the said arms being hinged to the outside of the side-rails by the ends of the rods $x$, which project through the rails. T T are adjustable arms secured to the side-rails on the inner sides; the said arms support the rod $y$, and by means of them the rear ploughs may be adjusted higher or lower. At the front end of the seed box is a shaft U, which extends across the frame, and is secured to the side-rails by means of boxing. To the end of the said shaft, on the left-hand side of the machine, is rigidly attached the arm 2, which extends back horizontally on the top of the side-rail for a short distance, and is curved upward, as shown in fig. 1. On the opposite end of the shaft U is rigidly attached the crooked lever 2', shown in fig. 2. To the arm 2 and lever 2' at 3 are jointed the rods 4, which extend back and are jointed to the rod $y$ at 5. The hooks 6 6 connect the beams P P to the arm 2 and lever 2'. The adjustable bar 7 is placed under the side-rails and extends from one to the other, and is attached to the side-rails by any means by which it may be conveniently adjusted higher or lower. The rear ends of the hounds 8 8 rest on this bar, and by adjusting it higher or lower the end of the tongue may be raised or lowered to adapt it to a large or small team. The guards 9 9, which are secured to the side-rails, serve as guides to retain the front ploughs in a proper position.

The operation of my machine is as follows, viz: The seed being placed in the box F, and the ploughs properly adjusted, the front ploughs M M will throw up a ridge with a furrow on the top of it as the machine is drawn over the ground, which has been previously prepared by ploughing. At the same time the axle is made to rotate by means of the clutch $p$, which, in its turn, causes the dropper-wheel H to revolve, and by means of the springs $d\ d$ and the inclined planes I and I', the droppers $b\ b$ are thrown in and drawn as has been described. When the droppers are thrown in so that their ends project beyond the bead $g$, the hooks on their ends grasp the seed, and when the droppers are drawn back the bead $g$ assists in retaining the seed in the hooks, and in passing through the bottom of the box the elastic pad 10 will force in or draw out any seeds that may project beyond the edges of the bead $g$ without mashing them. When the seed has been carried through the bottom of the box, the shoulders $e\ e$ on the droppers pass off the top of the inclined plane, and the springs $d\ d$ throw the droppers in, and the seed drops in the furrow on the top of the ridge, the apron 11 preventing it from scattering. In transporting the machine from place to place, turning at the ends of the rows, or passing over obstructions, all the ploughs may be raised from the ground at the same time by raising the lever 2', which will also operate the lever $s$ and throw the clutch out of gear, when both wheels will revolve without turning the axle or operating any of the machinery; or the clutch may be thrown out of gear by the lever $s$ without raising the lever 2'. It will readily be seen that the droppers will grasp and drop a uniform number of seeds, and the number of seeds may be increased or diminished by using droppers of greater or less capacity, the construction and manner of attaching the hooks being such that they may be easily removed from the dropper-wheel and others of different capacity substituted; and the seeds may be dropped any desired distance apart by using a greater or less number of droppers. I use droppers with hooked ends, as shown in fig. 8, only for planting cotton. For planting corn, broom corn, sorghum, &c., I use droppers with cups in them, as shown at 12 in fig. 9.

Having described my invention, what I claim as new, and desire to secure by Letters Patent, is—

1. The wheel H, droppers $b\ b$, springs $d\ d$, inclined planes I and I', and apron 12, constructed and operating substantially as and for the purposes set forth.

2. The seed box F, constructed substantially as described.

3. The plunger K, constructed and operated substantially as and for the purposes set forth.

4. The cam L in combination with the lever $j$, arms $i\ i$, spring $o$, and plunger K, substantially as and for the purpose set forth.

5. The combination of lever $s$, arm $t$, clutch $p$, pin $r$, and spring $u$, constructed and operating substantially as and for the purpose set forth.

6. The ploughs N N, bars R R, arms S S and T T, and rods $x$ and $y$, in combination with the lever 2' and arm 2, substantially as described.

7. The shaft U, arm 2, lever 2', rods 4 4, hooks 6 6, and beams P P, when used in combination, substantially as and for the purpose set forth.

8. The bar 7 in combination with the hounds 8 8, for the purpose set forth.

WM. L. GEBBY.

Witnesses:
R. H. GARDNER,
CHARLES HERRON.